(12) United States Patent
Xiao et al.

(10) Patent No.: US 11,927,854 B1
(45) Date of Patent: Mar. 12, 2024

(54) TOUCH PANEL WITH SPECIAL-SHAPED REGIONS AT LOWER EDGE OF LIQUID CRYSTAL DISPLAY BODY

(71) Applicant: ZHEJIANG CHANGXING HELI OPTOELECTRONICS TECHNOLOGY CO., LTD., Huzhou (CN)

(72) Inventors: Bin Xiao, Huzhou (CN); Guohua Liu, Huzhou (CN); Rao Huang, Huzhou (CN); Junhai He, Huzhou (CN)

(73) Assignee: ZHEJIANG CHANGXING HELI OPTOELECTRONICS TECHNOLOGY CO., LTD., Huzhou (CN)

( * ) Notice: Subject to any disclaimer, the term of this patent is extended or adjusted under 35 U.S.C. 154(b) by 0 days.

(21) Appl. No.: 18/318,550

(22) Filed: May 16, 2023

(30) Foreign Application Priority Data

Feb. 15, 2023 (CN) .......................... 202320212989.7

(51) Int. Cl.
| | |
|---|---|
| *G02F 1/1345* | (2006.01) |
| *G02F 1/1333* | (2006.01) |
| *G06F 3/041* | (2006.01) |
| *G02F 1/1339* | (2006.01) |

(52) U.S. Cl.
CPC .... *G02F 1/13452* (2013.01); *G02F 1/133368* (2021.01); *G02F 1/13338* (2013.01); *G06F 3/0412* (2013.01); *G02F 1/1339* (2013.01); *G02F 2201/56* (2013.01)

(58) Field of Classification Search
CPC .................................................. G02F 1/13452
See application file for complete search history.

(56) References Cited

U.S. PATENT DOCUMENTS

| | | | | |
|---|---|---|---|---|
| 2015/0293630 A1* | 10/2015 | Ishizaki | ................ | G06F 3/0448 345/174 |
| 2019/0064962 A1* | 2/2019 | Bye | .................... | G06F 3/041662 |
| 2023/0008148 A1* | 1/2023 | Hyun | .................... | G06F 3/0412 |

* cited by examiner

*Primary Examiner* — Joseph L Williams
(74) *Attorney, Agent, or Firm* — Westbridge IP LLC

(57) ABSTRACT

A touch panel includes a liquid crystal display body and a flexible printed circuit (FPC) electrically connected with the liquid crystal display body. The liquid crystal display body includes: sensing electrodes Rx, upper display screen glass, driving electrodes Tx, a color filter with a black frame, liquid crystals, a thin-film transistor drive array and lower display screen glass, where the liquid crystals are filled between the color filter with the black frame and the thin-film transistor drive array; and the liquid crystal display body comprises special-shaped regions at a lower edge of two sides of the liquid crystal display body.

11 Claims, 4 Drawing Sheets

TOUCH PANEL WITH SPECIAL-SHAPED REGIONS AT LOWER EDGE OF LIQUID CRYSTAL DISPLAY BODY

CROSS-REFERENCE TO RELATED APPLICATIONS

This application claims priority to Chinese Patent Application No. 202320212989.7, filed on Feb. 15, 2023, the content of which is incorporated herein by reference in its entirety.

TECHNICAL FIELD

The present disclosure relates to display panels, and in particular to a touch panel integrating touch and display functions with a particular shape.

BACKGROUND

Nowadays, with a rapid development of intelligent technology, touch panels integrating touch and display functions are widely used. Therefore, they are in great demand.

SUMMARY

The present disclosure provides a touch panel, including a liquid crystal display body and a flexible printed circuit (FPC) electrically connected with the liquid crystal display body. The liquid crystal display body may comprise: sensing electrodes Rx, upper display screen glass, driving electrodes Tx, a color filter with a black frame, liquid crystals, a thin-film transistor drive array and lower display screen glass. The liquid crystals are filled between the color filter with the black frame and the thin-film transistor drive array. The liquid crystal display body comprises special-shaped regions at a lower edge of two sides of the liquid crystal display body.

For the touch panel disclosed in the present disclosure, the special-shaped regions at the lower ends of the two sides of the liquid crystal display body are both formed by special-shaped cuttings, so that the lower display screen glass will not cover an inner surface of the upper display screen glass, and a pressure welding space can be reserved for Tx terminals of the driving electrodes Tx to be pressure welded with the FPC. That is, in the touch panel disclosed, enough space can be obtained to pressure weld the Tx terminals of the driving electrodes Tx with the FPC. In this way, the FPC can be electrically connected with the Tx terminals of the driving electrodes Tx and Rx terminals of the sensing electrodes Rx without obstruction.

In addition, the Tx terminals of the driving electrodes Tx can be fixed on an inner side of the upper display screen glass and the Rx terminals of the sensing electrodes Rx can be fixed on an outer side of the upper display screen glass. Moreover, by arranging the Tx terminals of the driving electrodes Tx on the inner side of the upper display screen glass, the probability of the Tx terminals being scratched can be lowered. Therefore, failures of touching detections can be avoided.

Moreover, by arranging wirings inside the upper display screen glass, multiple advantages can be achieved, such as spaces can be saved, the production efficiency can be improved, the cost can be lowered, an integration of touch and display functions can be achieved, and etc.

DETAILED DESCRIPTION OF THE EMBODIMENTS

To make the objectives, technical solutions and advantages of the present disclosure clearer, the present disclosure will be further described in detail below in conjunction with specific examples and with reference to the accompanying drawings.

It should be noted that, unless otherwise defined, technical terms or scientific terms used in one or more examples of the specification should have the ordinary meanings as understood by those of ordinary skill in the art to which the present disclosure belongs. The terms "first", "second" and similar words used in one or more examples of the specification do not denote any order, quantity, or importance, but are merely used to distinguish different components. The terms "including" or "comprising" and the like are intended to indicate that elements or objects in front of the word encompass elements or objects listed after the word and their equivalents, but do not exclude another element or object. Similar terms such as "connected" or "linked" are not limited to physical or mechanical connections, but may include electrical connections, whether direct or indirect. The terms "upper", "lower", "left", "right" and the like are only used to represent a relative positional relationship, and when an absolute position of a described object changes, the relative positional relationship may also change accordingly.

As previously mentioned, touch panels are in great demand. In this situation, a plurality of structures, such as an out-cell touch structure, an ONCELL structure and an INCELL structure can be used in the touch panels. However, a touch panel with the out-cell touch structure may be very thick. This kind of thickness problem will largely limit the usage the touch panel. Though a touch panel with the ONCELL structure or the INCELL structure does not have the thickness problem, the touch panel with the ONCELL structure or the INCELL structure has a long production period and a high cost.

In view of the above disadvantages, examples of the present disclosure provide a touch panel which is capable of integrating touch and display functions, and further solving the above problems through special-shaped cuttings.

Figure 1:
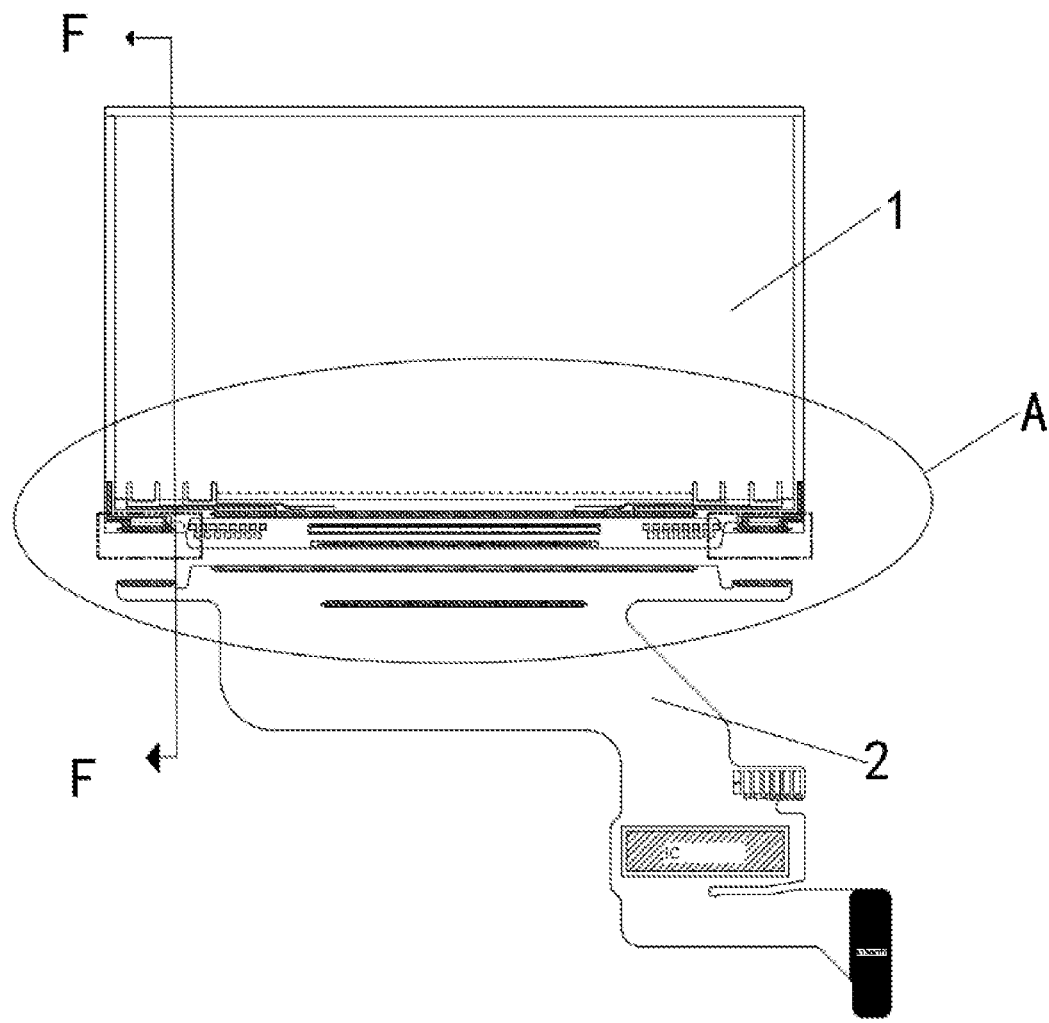
FIG. 1 is a schematic diagram illustrating a structural of a touch panel according to an example of the present disclosure.

FIG. 1 is a schematic diagram illustrating a structural of a touch panel according to an example of the present disclosure. As shown in FIG. 1, the touch panel described in this example of the present disclosure may include: a liquid crystal display body 1 and a flexible printed circuit (FPC) 2 which is electrically connected with the liquid crystal display body 1. To be noted, the FPC 2 may be an FPC integrating display and touch functions.

Figure 2:
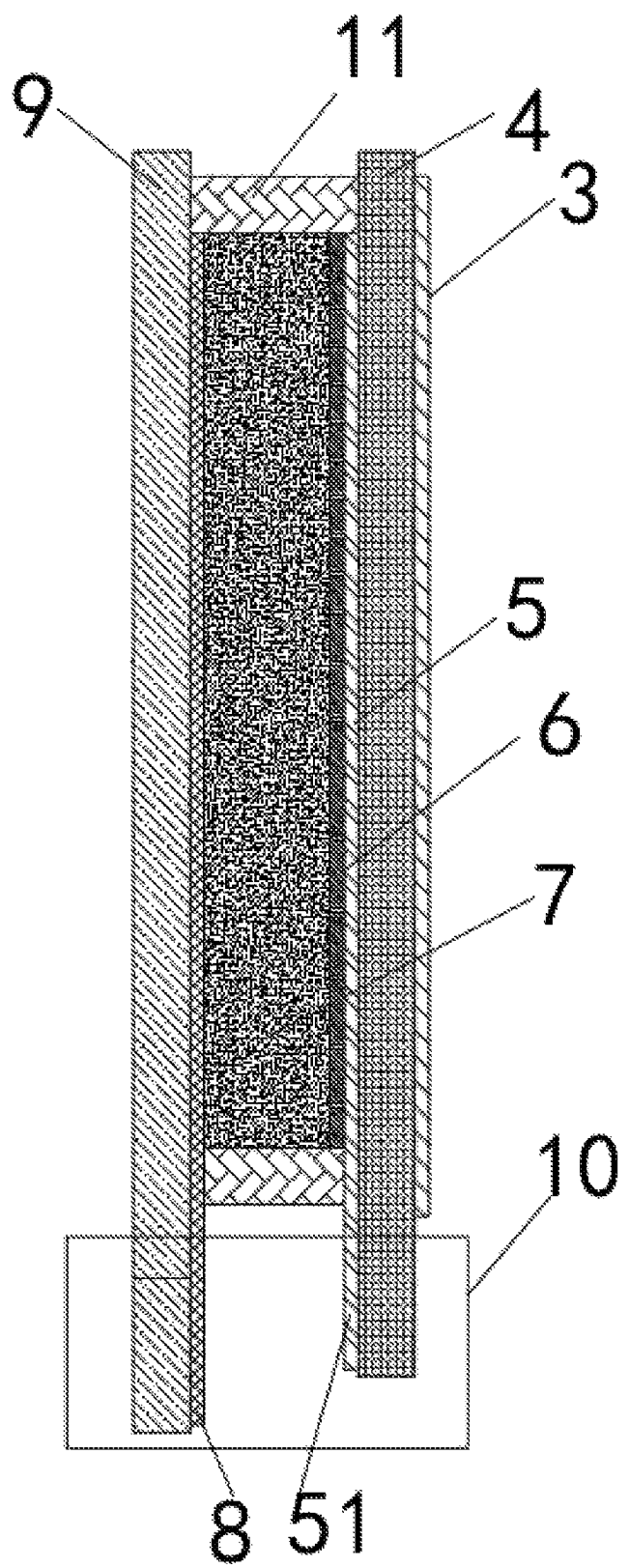
FIG. 2 is a cross-sectional view taken along line F-F in FIG. 1.

FIG. 2 is a cross-sectional view taken along line F-F in FIG. 1. As shown in FIG. 2, the liquid crystal display body 1 may include the following parts in an order from front to back: sensing electrodes Rx 3, upper display screen glass 4, driving electrodes Tx 5, a color filter with a black frame 6, liquid crystals 7, a thin-film transistor drive array 8 and lower display screen glass 9. In the liquid crystal display body 1, the liquid crystals 7 are filled between the color filter with the black frame 6 and the thin-film transistor drive array 8. In addition, the liquid crystal display body 1 may include two special-shaped regions 10 at a lower edge of two sides of the liquid crystal display body. Specifically, regions at lower ends of two sides of the liquid crystal display body 1 are both cut to form special-shaped regions 10 through special-shaped cuttings.

Further, the liquid crystal display body 1 may further include a sealant 11 between the upper display screen glass 4 and the lower display screen glass 9.

Figure 4:
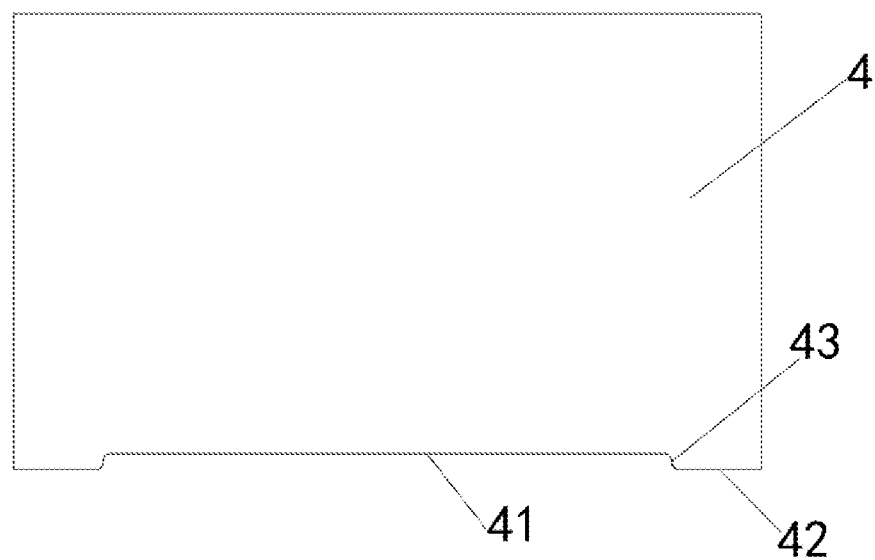
FIG. 4 is a schematic diagram illustrating a structure of the upper display screen glass of the present disclosure.

FIG. 4 is a schematic diagram illustrating a structure of the upper display screen glass of the present disclosure. As shown in FIG. 4, an upper edge and two side edges of the upper display screen glass 4 are straight lines. A lower edge is cut with two sides extending outward and a middle sunken. Specifically, the lower edge of the upper display screen glass 4 may include: a first straight line segment 41 in the middle, second straight line segments 42 located on two sides of the first straight line segment 41 and upper arch-shaped segments 43 for connecting the first straight line segment 41 with the second straight line segments 42. Wherein, the second straight line segments 42 are lower than the first straight line segment 41.

Figure 5:
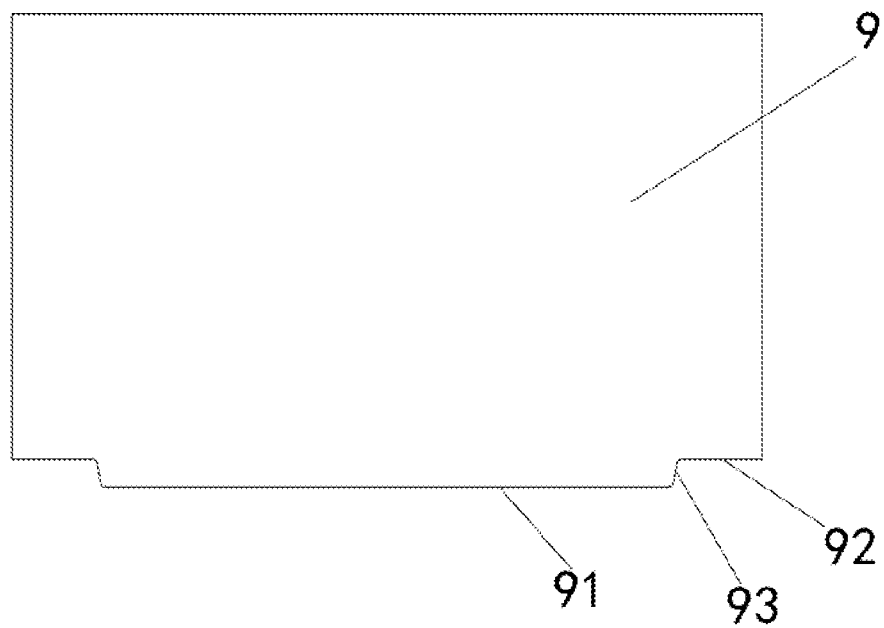
FIG. 5 is a schematic diagram illustrating a structure of the lower display screen glass of the present disclosure.

FIG. 5 is a schematic diagram illustrating a structure of the lower display screen glass of the present disclosure. As shown in FIG. 5, an upper edge and two side edges of the lower display screen glass 9 are straight lines. A lower edge is cut with two sides being indent and a middle part protruding outward. Specifically, the lower edge of the lower display screen glass 9 may include: a third straight line segment 91 in the middle, fourth straight line segments 92 located on two sides of the third straight line segment 91 and lower arch-shaped segments 93 for connecting the third straight line segment 91 with the fourth straight line segments 92. Wherein, the third straight line segment 91 is lower than the fourth straight line segments 92.

It can be seen from the figures, each special-shaped region 10 may include a second straight line segment 42 and a fourth straight line segment 92. That is, both the second straight line segment 42 and the fourth straight line segment 92 are located in the special-shaped region 10. Moreover, the second straight line segment 42 is lower than the fourth straight line segment 92. In this structure, a region or a space below the fourth straight line segment 92 and between the upper display screen glass 4 and the lower display screen glass 9 can be reserved. In examples of the present disclosure, this region or this space reserved can be called as a pressure welding space for pressure welding TX terminals of the driving electrodes Tx 5 with the FPC 2.

Figure 3:
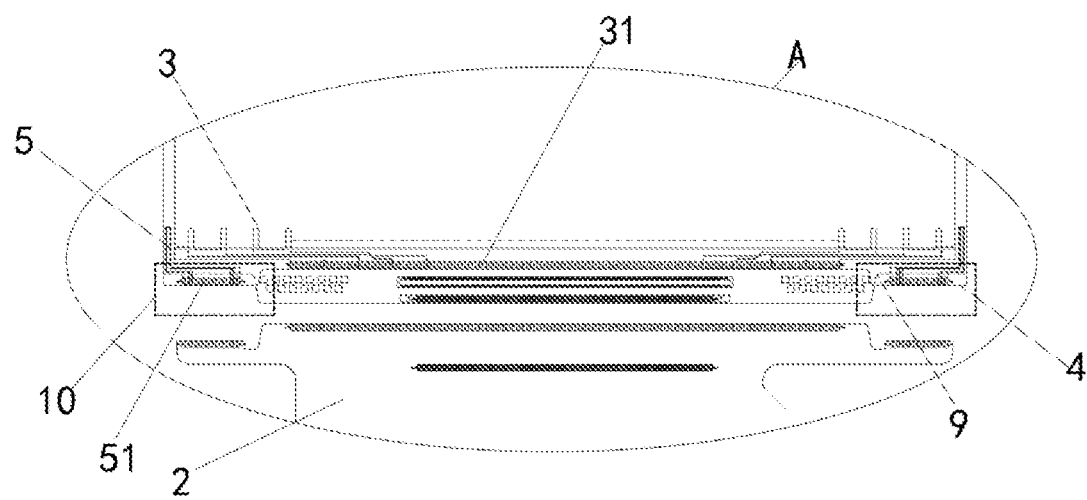
FIG. 3 is an enlarged view of part A in FIG. 1.

FIG. 3 is an enlarged view of part A in FIG. 1. As shown in FIG. 3, the driving electrodes Tx 5 may further include a plurality of Tx terminals 51. The Tx terminals 51 are located in the pressure welding space. Moreover, The Tx terminals 51 are fixed to one side of the upper display screen glass 4 facing to the lower display screen glass 9, that is, an inner side of the upper display screen glass 4 facing the lower display screen glass 9. Moreover, the sensing electrodes Rx 3 may further include a plurality of Rx terminals 31. The Rx terminals 31 is fixed to one side of the upper display screen glass 4 away from the lower display screen glass 9, that is, an outer side of the upper display screen glass 4 away from the lower display screen glass 9. As shown in FIG. 3, the Rx terminals 31 may be located in a space above the first straight line segment 41.

To be noted, the touch panels disclosed can be liquid crystal touch panels with glass substrates. The touch panels disclosed can also be OLEDs or micro LEDs with glass substrates and flexible materials. Moreover, the touch panels disclosed may be produced in different sizes, such as, in a small size, in a medium size or in a large size.

The examples of the disclosure are intended to embrace all such alternatives, modifications, and variations as to fall within the broad scope of the appended claims. Therefore, any omission, modification, equivalent replacement and improvement made within the spirits and principles of the examples of the present disclosure shall fall within the protection scope of the present disclosure.

What is claimed is:
1. A touch panel, comprising:
a liquid crystal display body; and
a flexible printed circuit (FPC) electrically connected with the liquid crystal display body; wherein,
the liquid crystal display body comprises: sensing electrodes Rx, upper display screen glass, driving electrodes Tx, a color filter with a black frame, liquid crystals, a thin-film transistor drive array and lower display screen glass;
the liquid crystals are filled between the color filter with the black frame and the thin-film transistor drive array; and
the liquid crystal display body comprises special-shaped regions at a lower edge of two sides of the liquid crystal display body.
2. The touch panel according to claim 1, wherein,
an upper edge and two side edges of the upper display screen glass are straight lines;
a lower edge of the upper display screen glass is cut with two sides extending outward and a middle sunken;
the lower edge of the upper display screen glass comprises: a first straight line segment in the middle, second straight line segments located on two sides of the first straight line segment and upper arch-shaped segments for connecting the first straight line segment with the second straight line segments; and
the second straight line segments are lower than the first straight line segment.
3. The touch panel according to claim 2, wherein,
an upper edge and two side edges of the lower display screen glass are straight lines;
a lower edge of the lower display screen glass is cut with two sides being indent and a middle protruding outward;
the lower edge of the lower display screen glass comprises: a third straight line segment in the middle, fourth straight line segments located on two sides of the third straight line segment and lower arch-shaped segments for connecting the third straight line segment with the fourth straight line segments; and
the third straight line segment is lower than the fourth straight line segments.
4. The touch panel according to claim 3, wherein,
one second straight line segment and one fourth straight line segment on one side of the liquid crystal display body are located in one of the special-shaped regions;
the second straight line segment is lower than the fourth straight line segment; and a pressure welding space is formed below the fourth straight line segment and between the upper display screen glass and the lower display screen glass.

5. The touch panel according to claim 4, wherein the driving electrodes Tx comprise Tx terminals; the Tx terminals are located in the pressure welding space and on an inner side of the upper display screen glass facing the lower display screen glass.

6. The touch panel according to claim 5, wherein the FPC is electrically connected with the Tx terminals.

7. The touch panel according to claim 2, wherein the sensing electrodes Rx comprise Rx terminals; the Rx terminal are located on an outer side of the upper display screen glass away from the lower display screen glass.

8. The touch panel according to claim 7, wherein the Rx terminals are located in a space above the first straight line segment.

9. The touch panel according to claim 7, wherein the FPC is electrically connected with the Rx terminals.

10. The touch panel according to claim 1, wherein the sensing electrodes Rx and the driving electrodes Tx form a touch sensor.

11. The touch panel according to claim 1, wherein the liquid crystal display body further comprises: a sealant between the upper display screen glass and the lower display screen glass.

* * * * *